United States Patent Office 3,447,906
Patented June 3, 1969

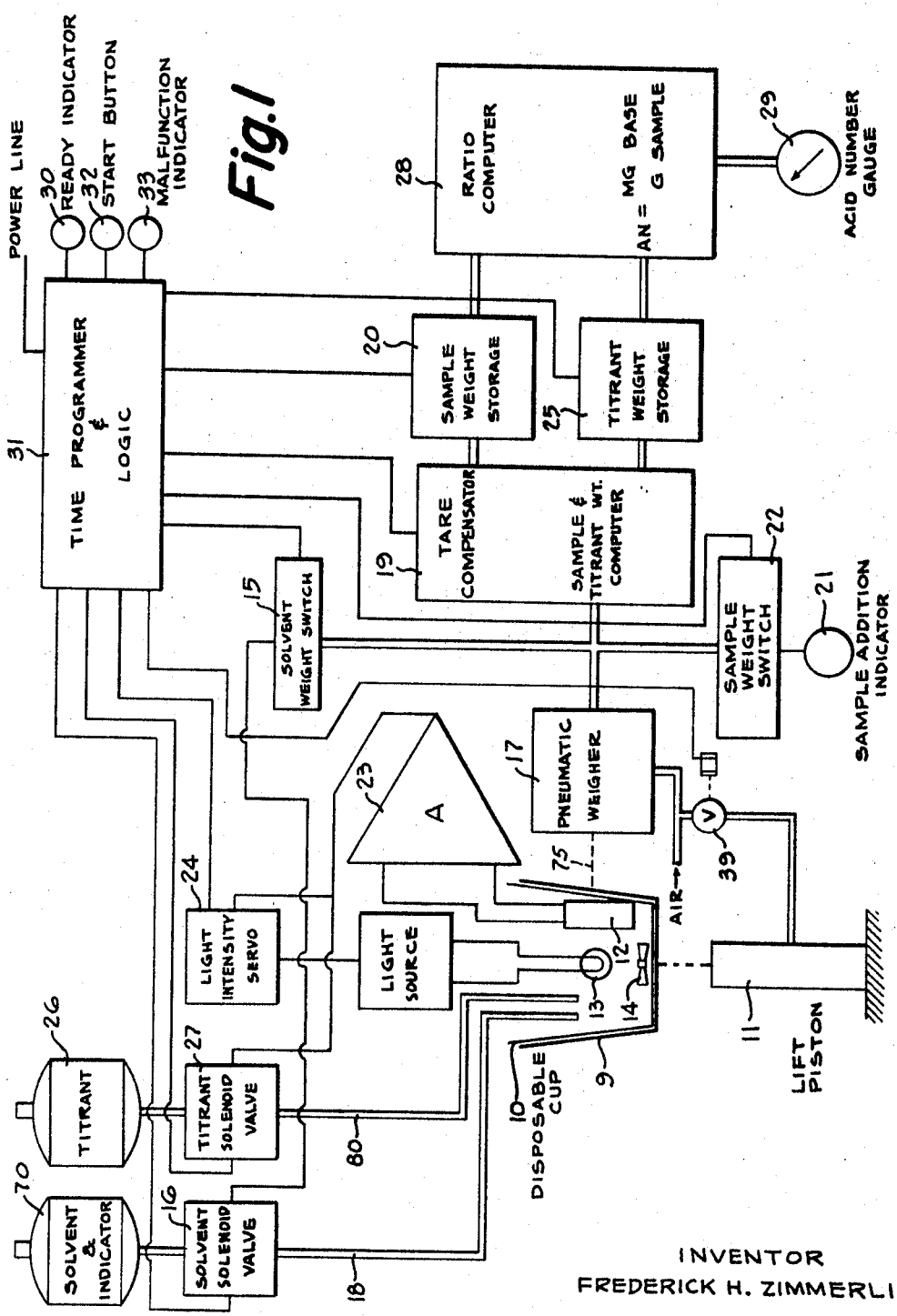

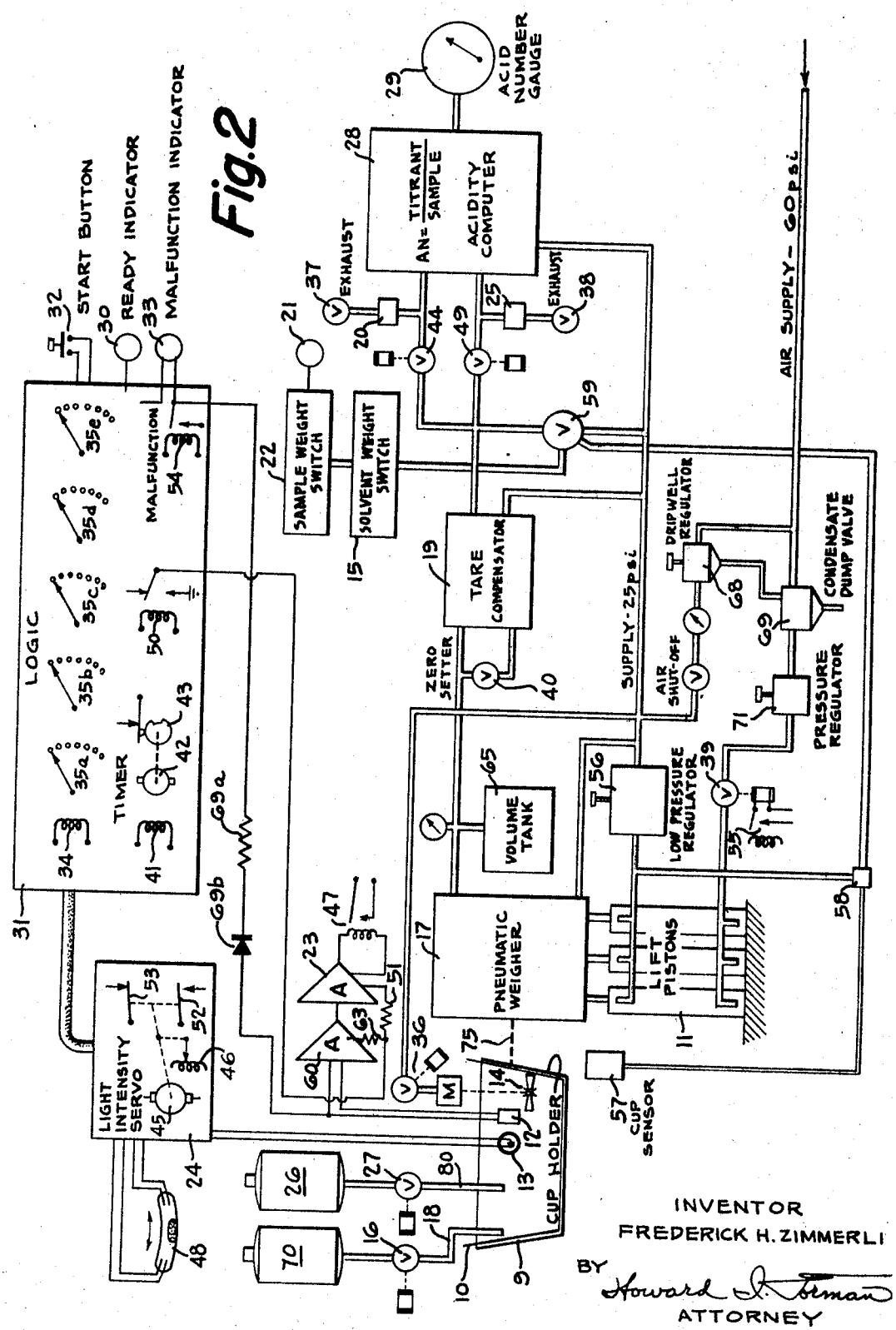

3,447,906
AUTOMATIC GRAVIMETRIC TITRATOR FOR BATCH OPERATION
Frederick H. Zimmerli, Ambler, Pa., assignor to Rohm & Haas Company, Philadelphia, Pa., a corporation of Delaware
Filed Jan. 21, 1966, Ser. No. 522,292
Int. Cl. G01n *31/16*
U.S. Cl. 23—253                6 Claims

ABSTRACT OF THE DISCLOSURE

Automatic batch type titrator having a titration vessel supported by a weighing means, a solvent supply means, a titrant supply means, and end point detector means, means for automatically controlling: (1) the addition of said solvent to an amount sufficient to dissolve the sample, and (2) the addition of said titrant to an amount sufficient to reach an end point as determined by said detector means, signalling means associated with said weighing means capable of providing signals representative of the actual weights of solvent, sample, and titrant added to said vessel, means for conveying said solvent signal to an operator, so he can add sample, first and second means for receiving and storing said sample and titrant signals, and means for retrieving said latter signals and computing the titration result.

---

This invention relates in general to chemical analyzing equipment and more particularly to a process and apparatus for the automatic titration of samples tested in batch form.

Titrations are useful for the quantitative analysis of samples from solutions being tested. Many different methods for titrating have been developed in the past. These known methods may be divided into three types for purposes of discussion. The first type is completely manual in operation. A sample of material, for example a solution containing an unknown quantity of acid, is measured by the operator. A suitable pH-sensitive color indicator may be added to the sample, after which quantities of a neutralizing solution, or titrant, are added until the solution either changes color, returns to the original color, or becomes clear, depending on the materials used. Large scale manual titration requires considerable skill and also consumes a great deal of time, but may be quite accurate if the operator is sufficiently capable.

In order to obviate the disadvantages of manual titration, only a few of which are mentioned above, various types of so-called "automatic" titrating units have been suggested. For example, continuous titrating systems are described in U.S. Patent No. 2,627,453, to R. T. Sheen, dated Feb. 3, 1953, and in U.S. Patent No. 2,668,097, to K. E. Hallikainen et al., dated Feb. 2, 1954. These systems utilize a means for extracting a sample from the main body of material about which the information is desired, and continuously passing it into a titrating vessel. Titrant is continuously mixed with the sample solution in the vessel, the object being to maintain that material within the titrating vessel in a continuous state of equivalence or neutralization. Although this system appears sound from a theoretical standpoint, many disadvantages arise in actual practice. For example, it is extremely difficult to maintain a continuous neutral state, since fresh material to be titrated, and fresh titrant, continuously flow into the titrating cell. Moreover, the results obtained, whether they be visual indications, or recordings or corrections made with the aid of an electrical measuring device, are not as accurate as desired, particularly when compared with the results obtainable through manual titration by a skilled operator. Additionally, a considerable amount of material, not only for the main solution but also of the titrant, is required for the titrating operation. This material, of course, is useless once titration has been accomplished and, therefore, may be considered waste.

Notwithstanding certain obvious advantages of a continuous titration system such as described above, a sample "batch" unquestionably can be measured out and titrated with greater accuracy then can two continuously flowing streams be blended together. Accordingly, where a high degree of accuracy is essential, the batch system of titration has prevailed. A considerable amount of research and development on the latter type of titrating system has been done by Dr. H. V. Malmstadt and E. R. Fett. One of their most recent articles, "Automatic Differential Potentiometric Titrations," is reported in the November 1955 edition of Analytical Chemistry, vol. 27, pages 1757 et seq. This article is primarily concerned with the operation and various applications of the Sargent-Malmstadt Titrator, produced by E. H. Sargent and Company of Chicago, Ill. See also U.S. Patent No. 2,898,200, which issued on Aug. 4, 1959, to the aforesaid Sargent Company.

The Sargent-Malmstadt titrator mentioned above, although generally referred to in the trade as "automatic," actually is automatic only insofar as concerns determination of the end point of titration, which corresponds to the inflection point on a potentiometric titration curve. Briefly, the device operates as follows: A predetermined quantity of a solution to be titrated is manually withdrawn from the supply source and placed in a titrating cell. A pair of electrodes, one reference and the other indicating, is immersed in the sample. The titrator is then placed in operation. This device feeds a titrant into the cell until a sudden change in potential across the electrodes is produced, which corresponds to the end point of titration. This unit produces very accurate measurements such as described above in connection with manual titration, but it lacks the desired operator independence concomitant with practice of the continuous titrating system. In other words, although presence of the operator is not required for the end point determination, it is necessary that he manually select a sample, place the same in the titrating cell, initiate operation of the titrator, take readings from and refill the titrant burette, clean the cell, and repeat these operations when subsequent titrations become necessary.

It can be seen from the foregoing that there are many disadvantages to (a) manual titration of batches, (b) continuous titration of flowing samples, and to (c) single determinations produced by so-called automatic titrators operating on manually-supplied batches. With these disadvantages in mind, the objects of the present invention may now be specified as follows:

A primary object of the present invention is to provide an automatic titrating process and apparatus having the advantages of known devices but few of the disadvantages thereof.

A further object of this invention is to provide an automatic titrating process and apparatus affording the accuracy of batch type manual titrations by a skilled operator, the elimination of analyst skills as in known continuous titration systems, and the rapidity of batch type titrators having electronic control circuits for determining the end point of titration.

Another object of the present invention is to provide an automatic titrating process and apparatus which utilizes small quantities of titrant and consumes little of the main solution to be tested.

Still another object of this invention is to provide an automatic titrating process and apparatus which weighs the sample and titrant automatically.

Another object of this invention is to provide an automatic titrating process and apparatus which computes the titration result automatically.

An additional object of this invention is to provide an automatic titrating process and apparatus which accurately computes the titration result from an inaccurately measured solution sample.

Another object of this invention is to provide an automatic titrating process and apparatus which compensates for initial analytical differences between solution samples.

Still another object of this invention is to provide an automatic titrating process and apparatus which requires no equipment cleaning by using disposable titration vessels.

Another object of this invention is to provide an automatic titrating process and apparatus which will accept solution samples from a variety of sources such as from the operating equipment in a chemical production plant.

Another object of this invention is to provide an automatic titrating process and apparatus which is designed as an explosion proof device for operation in hazardous areas.

The foregoing objects may be accomplished, in accordance with the present invention, by providing means to manipulate a logic circuit without assistance from an operator, to indicate when to add solution sample, to indicate when sufficient solution sample has been added, to add diluting solvent, to add titrant, to determine the end point of titration, to measure weight of sample and titrant added, to compute the result, and to indicate that result.

Additional objects and advantages of this invention will be apparent to those skilled in this art upon study of the following detailed disclosure of a preferred embodiment taken in conjunction with the accompanying drawings, wherein:

FIG. 1 is a block diagram of a preferred embodiment of the invention illustrating the underlying principle of operation of the automatic titrator; and FIG. 2 is a schematic diagram of the same preferred embodiment illustrating the operative relationships of the switches, valves, and other mechanical and pneumatic parts of the apparatus, as well as the electrically activated stepping switch logic which successively programs the automatic titrator, and amplifier which makes possible photoelectric detection of the colorimetric end points.

Although definitely not limited to such in its application, the present invention is particularly addressed to the manufacture of synthetic organic resins and will be described in more detail below in connection with a method for determining the acidity of the resins during manufacture.

The regular analysis of the acid content of resins being manufactured is very important for the determination of the progress stage is completed and the next stage can be started. If not, another stage requiring rework must be followed. Speed and accuracy with the automatic titrator improves the efficiency of manufacture since delay and human judgment associated with manual titration are eliminated.

Before discussing the preferred embodiment of the invention, as illustrated in the accompanying drawings, it may be well to describe in general terms the underlying operative principle of the apparatus. In the first place, all measurements are made by weighing. The titration vessel (a disposable paper cup) is attached to a weighing transducer which weighs the solvent, sample, and titrant, and uses those results in the operation of the computing and programming equipment.

The sequence of operation starts with the placement of a fresh titration vessel by the operator. A start button is depressed, and an automatic program commences the titration operations according to the following sequence:

(1) Titration vessel is moved to the titration position.
(2) Pneumatic data storage system is cleared.
(3) A pre-determined amount of solvent is added.
(4) Weighing system is re-zeroed.
(5) Sample is added by the operator.
(6) Sample is weighed.
(7) Colorimetric end point detector is re-zeroed.
(8) Weighing system is re-zeroed.
(9) Titrant is added until color end point is reached.
(10) Titrant is weighed.
(11) Ratio of titrant to sample is computed and end result is indicated by a pneumatic pressure gauge.
(12) Titration vessel is lowered for cup replacement and the system is ready for next analysis.

All operations except cup replacement, starting and sample addition are automatic. Once the start button is pushed, the titration vessel with its fresh cup is raised to the level of the end point detector, titrant delivery tube, solvent delivery tube, and the stirrer. Solvent is added until the end point detector is covered, and then the flow of solvent is shut off by means of a pressure switch which is set to close a solenoid-activated switch when the solvent reaches a proper level. The weighing system then re-zeroes itself at the pressure level of the solvent weight.

When the above-indicated numbered sequences are completed the operator is put on notice, by means of a light and buzzer system, that the titration apparatus is ready for the sample. A stirrer also turns on to insure complete mixing of the sample. The light and buzzer continue to operate until the operator has poured a sufficient amount of the sample into the cup. An important feature of the titrator is that the operator does not actually weigh the sample. Only an approximate amount need be added since the computer will calculate the acid number from the actual sample weight. During the weighing step the stirrer is turned off to remove any false weight due to stirrer vibration.

The end point is determined colorimetrically. This is made possible by a liquid tight photoelectric assembly containing proper optical filters which is submerged in the solvent-sample mixture during titration.

After light intensity adjustments, and before titrant addition, the weighing system is re-zeroed. After titration, the mixture is monitored for a false end point. Then, with the stirrer off, the total titrant added is weighed and the ratio of titrant to sample is computed. This ratio, proportional to the acid number, is an air pressure that is measured by a gauge or recorder.

The titration now is returned to the ready position by lowering the titration vessel and lighting the ready lamp. The result of the titration continues to be displayed and remains until the start button is pushed. Thus, the data are not lost after the titration is completed.

The program is wired into a multi-bank stepping switch. The stepping operation is controlled by a timing device. A pressure operated switch is closed to step the program when a sufficient amount of sample has been added. When the end point is reached, the photocell circuit steps the program and shuts off titrant flow. A second pressure switch shuts off solvent addition. However, for safety purposes, the timer steps the program. A malfunction might cause solvent overflow, if the solvent addition weight were used to step the program.

A number of the components of the apparatus are commercially available pieces of equipment and need not be described herein detail. For example, the weighing transducer is an electro-pneumatic converter. The penumatic re-zeroing device is a conventional multi-function relay whose output is the difference between two input air pressures so that when both pressures are the same the output is zero. The acid number computation is made by a conventional pneumatic computer which produces an air pressure proportional to the titrant weight pressures divided by the sample weight pressure. The submersible detector is made of two parts, one being the filter-photocell assembly and the other being the lamp-housing. A combination of conventional magnetic and transistor amplifiers are used to amplify the photocell signal change. A number of chemical-color change indicators may be used to indicate the end point of the titration, although phenolphthalein generally is preferred.

Turning now to the drawings, with attention directed first to FIG. 1, reference numeral 10 represents a titration vessel in the form of a plastic coated hot drink paper cup supported by a paper cup holder 9 (in FIG. 2) formed to the same shape as the cup and of such a size that it will hold the cup securely and minimize any sidewise motion of the cup. One or more lift pistons 11 lowers the cup holder with its paper cup at the end of each titration and returns the cup holder to the titration position after a fresh empty cup has replaced the partly full used cup that contains the liquids from the previous titration. Piston travel is sufficient to enable the cup to be withdrawn easily. When the cup 10 is in the titration position functional leads from photocell 12 and light source 13, as well as stirrer 14 are well within the cup.

Solvent and indicator then are drawn from their supply vessel 70 to partly fill the cup to a pre-set level which submerges stirrer 14 and the photocell 12 and light source 13 functional leads. This pre-set level is controlled by a solvent weight switch 15 that actuates a solvent solenoid 16 to cut off the flow of solvent and indicator when the air pressure from a pneumatic weigher 17 exceeds the setting within solvent weight switch 15. Pneumatic weigher 17 is mechanically attached at 75 to the paper cup holder that holds the paper cup 10, and develops a pneumatic air pressure that is a direct function of the weight of the paper cup 10 and its contents.

After the solvent and indicator have been drawn from supply vessel 70 and are transferred to cup 10 by delivery tube 18, a tare compensator 19 is adjusted to produce a pneumatic tare signal for a sample weight storage unit 20. Upon completion, a sample addition indicator 21 is lighted indicating that the sample can be added to the solvent and indicator in the paper cup 10. The stirrer 14 is energized (by electrical means, for example, a motor shown generally in FIG. 2 at M) to aid mixing of sample and solvent. Sample weight switch 22 shuts off sample addition indicator 21 when sufficient sample has been added. The sample weight storage 20 is then energized to accept a pneumatic pressure proportional to the actual sample added. The pneumatic pressure is next sealed in the sample weight storage 20. Photocell 12 produces a signal for a photocell amplifier 23 that amplifies the signal emitted by photocell 12 and corrects the intensity of light source 13 through a light intensity servo 24 so as to compensate for the turbidity, color and opaqueness of the sample. Next, the tare compensator 19 is used to produce the pneumatic tare weight for the titrant weight storage 25. Then a titrant is allowed to flow from a container 26 therefor into the paper cup 10 by the operation of a solenoid actuated valve 27 controlling flow of the titrant until the color of the sample and solvent mixture in the paper cup 10 changes at the stoichiometric end point. Titrant weight storage 25 is sealed off, holding the pressure that is proportional to the actual weight of titrant added to the paper cup 10.

Pneumatic signals representing the sample weight and titrant weight are applied to a pneumatically operated ratio computer 28 for the computation of the acidity. An example of the information which can be typically calculated in this manner is the determination of the milligrams of base required to neutralize a gram of sample. This result is indicated on an acidity or acid number gauge 29. Upon completion of the titration, a "ready" indicator 30 is lighted and lift piston 11 lowers the paper cup 10 to a position where it can readily be removed and replaced.

A time programmer and logic 31 device controls all of the operations stated above once a start button 32 has been pushed by the operator. The ready indicator 30 remains on until the start button 32 is depressed. A malfunction indicator 33 is lighted only if one of several malfunctions occurs. As an example, the malfunction indicator 33 will light when the demand for the titrant exceeds the maximum titrant weight acceptable by the automatic titrator, or if the sample is excessively opaque. With the aid of a resistor and a rectifier (both not shown) a photocell relay 47 (see FIG. 2) is energized whenever the sample is too dark. This simulates an end point condition and allows the operation of the automatic titrator to proceed to completion.

Referring now to FIG. 2, a more detailed description of the preferred embodiment of the automatic titrator will now be given. Much of this is in the time programmer and logic device 31. Start button 32 energizes a drive coil 34 of a five-bank, eleven-position stepping switch 35a, 35b, 35c, 35d, 35e, if solvent weight switch 15 has its normally open contact closed. A cup-sensing safety interlock 59, which actually is a three-way air valve, must be set so as to transmit a pneumatic signal for the automatic titrator to start. In position one of stepping switch 35 two exhaust solenoids 37 and 38 are energized to allow the stored pneumatic signal from the previous titration to be released and a solenoid actuated three-way lift valve 39 is operable to transmit air to the lift piston 11. A zero-setting solenoid member 40 activates the tare compensator 19 to remove any tare signal. At the same time, the timer is started as coil 41 is energized to allow timer motor 42 to run, causing contacts 43 to open after a period of time and thereby energize the stepping switch coil 34.

In position two of switch 35 solvent and indicator from supply vessel 70 are added until solvent weight switch 15 opens. Again the timer motor 42 runs to advance stepping switch 35 to position three where the tare zero-setting solenoid 40 is opened for tare compensation. Timer motor 42 runs to advance stepping switch 35 to position four where a stirrer-operating solenoid 36 allows air to drive stirrer 14, and illuminate sample addition indicator 21.

When sufficient sample has been poured into paper cup 10 sample weight switch 22 energizes stepping switch coil 34 to advance switch 35 to position five. The indicator 21 may be extinguished to indicate that a sufficient amount of sample has been added to the cup 10 by the operator of the apparatus. Sample weight solenoid 44 is energized, allowing the pneumatic signal from the pneumatic weigher 17, through the tare compensator 19, to reach sample weight storage 20. Again, the timer motor 42 causes the stepping switch 35 to advance to position six, and this causes the light intensity servo 24 to adjust the light source by actuating a servo motor 45. The servo motor mechanically moves the movable arm of a variable autotransformer 46 in one direction until the photocell 12, through its amplifier 23, causes the photocell relay 47 to reverse its operation and force the servo motor 45 to reverse direction. A mechanically operated mercury switch 48 energizes the stepping switch coil 34 when the mercury switch 48 is rotated counterclockwise (this is in position six of switch 35), and the stepping switch coil 34 is energized again when the mercury switch 48 is rotated clockwise (position seven of switch 35). This defines a band of photocell output intensities within which a titration end point will be detected.

In each titration the light intensity reaching photocell 12 will be the same after the servo motor 45 and mercury switch 48 have completed their functions which are geared to positions six and seven of switch 35. Zero-setting solenoid 40 is energized in position eight of switch 35 to adjust the tare compensator 19. At the same time, the timer motor 42 causes switch 43 to be closed, thereby causing the stepping switch coil 34 to be energized, and thus move stepping switch 35 to the step nine position where titrant flow control solenoid 27 is energized to allow titrant to flow from container 26 through delivery tube 80 into paper cup 10. The titrant continues to flow while the stirrer 14 aids mixing, and is stopped when the color between light source 13 and photocell 12 has changed enough to operate photocell relay 47. The titrant flow is shut off and stepping switch 35 is stepped to position ten, at which point timer motor 42 starts, stirrer 14 stops, and a solenoid actuated titrant weight device 49 is energized to receive a pneumatic signal from the tare compensator 19 representative of the weight of titrant added to the cup 10. The stepping switch is stepped to position eleven where the solenoid actuated lift valve 39 releases and allows the lift pistons 11 to lower the paper cup holder 9 and cup 10, and ready indicator 30 is illuminated. Acidity will be indicated on the acidity gauge 29.

Auxiliary circuits optionally may be included. A relay 50 may be employed to open the circuit on a gain control resistor 51 when switch 35 is in positions six and seven to increase the gain of photocell amplifier 23 during the rezeroing operation. Relay 50 also connects the servo motor 45 to the stepping switch. Two limit switches 52–53, the former normally open, and the latter normally closed, protect the autotransformer 46 from overtravel. Limit switch 52 also causes the timer motor 42 to run, thereby causing the automatic titrator to continue in its program. A relay 54 causes a malfunction to be indicated by light 33 whenever one of several malfunctions occurs. A relay 55 is wired to keep the lift solenoid 39 continually energized during a titration.

Details of the pneumatic mechanical and solution circuits are also shown in FIG. 2. The holder 9 for the paper cup 10 is mechanically attached to the pneumatic weighing device 17 by means of an arm 75 fastened to the balance beam of that device which serves to convert an electric current to pneumatic pressure. Terminals of the electric current coil are short-circuited to provide mechanical damping. Three lift pistons 11 raise and lower the pneumatic weigher 17 by air pressure controlled by the lift solenoid valve 39. Air pressure to force the lift pistons 11 down is controllably supplied with the aid of a low pressure regulator 56. This pressure is also used to supply air to cup sensor 57. When paper cup 10 is in place a back pressure developed in cup sensor 57 is transmitted to the solvent weight switch 15 to permit operation of the automatic titrator. A restriction T 58 is used to limit the air flow, and the three-way pneumatically operated valve or cup-sensing interlock 59 is used to switch in higher pressure to operate the solvent weight switch 15. A solenoid controlled zero-setting device 40 equalizes pressure between two opposing force members of the tare compensator 19 when energized by the time programmer and logic member 31. Sample weight storage 20 has the sample weight solenoid 44 and an exhaust solenoid 37 for pressure inlet and pressure letdown. Titrant weight storage 25 has the titrant weight solenoid 49 and exhaust solenoid 38 for pressure inlet and pressure letdown.

A volume tank 65 aids in stabilizing the pneumatic signal from the pneumatic weigher 17. A range solenoid and range indicator (not shown) are used to indicate which of two ranges are in use. A dripwell regulator 68, a condensate dump valve 69, and a pressure regulator 71 are employed in the standard manner of conventional pneumatic control systems.

In the simplified FIG. 2 construction the photocell is comprised of a low level magnetic amplifier 60 and a power supply (not shown). The amplifier acts as a preamplifier to detect changes in current flow through the photocell 12. A source of potential for the photocell 12 is derived from the power supply (not shown) required by the magnetic amplifier. The power amplifier circuit 23 increases the change in current sufficiently to operate the photocell relay 47. Resistors 51 and 63 form a current gain-reducing circuit to allow the photocell circuit to be more sensitive to changes occurring to the photocell during the operation of the light intensity servo 24 than during titration. More stable operation is thus obtained.

From the foregoing description of a preferred embodiment the construction and operation of my inventive apparatus should be clear. The advantages which it possesses over conventional process type automatic titrators should also be apparent. In the prior art systems the solvent, titrant, and sample are measured by volume or by metering. Some make continuous titrations but the great majority make batch, laboratory type titrations with laboratory type equipment placed in a protective housing and under control of a program timer. Some of them are quite satisfactory for plant use; however, they require special handling for the samples must be clear, free-flowing and free from sticking. Some of them can handle petroleum products, water, etc. fairly well, but they do an unsatisfactory job of automatically titrating chemicals, especially those that stick to equipment, tend to polymerize, or contain solids.

Actually, chemicals can be automatically titrated in equipment that can measure actual weights of samples used. The present invention, of course, does this. Its recommended use of discardable paper cups instead of glass or metal titration vessels, its completely automatic operation, automatic acid number computation, and manual sample addition, all are factors which serve to eliminate major problems with piping a representative sample to the titrator.

EXAMPLE

The equipment described above, and illustrated in the accompanying drawings, was used to titrate a sample taken from a full-scale plant manufacturing operation. The sample consisted of dioctyl adipate and was extracted directly from the manufacturing kettle. Samples had been taken hourly for analysis of the acidity or acid number. (The acid number is defined as the ratio of the number of milligrams of potassium hydroxide required to neutralize one gram of sample.) A sample was taken, and part of it was titrated on the automatic titrator and part titrated by manual titration in a control laboratory. The automatic titrator was used in the following way. The operator, after observing that the ready indicator 30 was on, pushed start button 32. The disposable cup holder 9 did not rise as expected because the operator had neglected to place a fresh disposable cup 10 into the holder. After obtaining a cup and placing it in the holder he again pressed the start button. The holder and the disposable cup were raised to the titrate position. This action was caused by the energizing of relay 55 that activates the lift solenoid 39 which allowed air to flow into the lift pistons 11. At the same time the timer start coil 41 was energized to allow the timer motor 42 to run. Also, at the same time the exhaust solenoids 37 and 38 were energized to vent all of the trapped air in the sample weight storage 20 and titrant weight storage 25. Also the zero solenoid member 40 was energized to remove any tare weight signals from the previous titration. After 20 seconds the stepping switch 35 advanced to step 2. Here the timer motor 42 was again energized to allow solvent and indicator to flow into the disposable cup 10. When sufficient solvent and indicator had been put into the cup a pneumatic pressure proportional to the weight of solvent and indicator in the cup caused the solvent weight switch 15 to trip, shutting off power to solvent solenoid 16. About seven seconds later the timer motor 42 caused the stepping switch 35 to transfer to step 3. In step 3 the zero solenoid 40 of the tare compensator 19 was energized to accept the pneumatic tare weight signal representing the weight of solvent and indicator in disposable cup 10. The timer motor 42 was energized and caused the stepping switch 35 to transfer to step 4 after 20 seconds. Sample addition indicator 21 was lighted and the stirrer was electrically energized. The automatic titrator waited until a sufficient amount of the dioctyl adipate obtained from the reaction vessel was poured into the disposable cup 10. As the operator poured the sample into the cup 10 the pneumatic signal from the pneumatic weigher 17 increased proportionally to the amount added. When the amount added produced a pneumatic signal sufficient to operate the sample weight switch 22 the stepping switch 35 was advanced to step 5. In step 5 the stirrer 14 and the sample addition indicator 21 were turned off, thus informing the operator that he had put enough sample into the disposable cup 10. In the preferred embodiment of the automatic titrator the sample weight switch 22 is set to operate when the pneumatic signal from the pneumatic weigher 17 has increased six pounds per square inch. This represents about 5 grams of sample. In step 5 the sample weight solenoid 44 of sample weight storage 20 was energized to admit the pneumatic signal proportional to the exact sample weight in the cup 10. Again the timer motor 42 operated to advance the stepping switch 35 to step 6 after a period of 20 seconds.

At the same time the light intensity servo 24 adjusted the light source 13 to compensate for opaqueness or color of the sample. The pneumatic pressure proportional to the sample weight was sealed into the sample weight storage 20 when the sample weight solenoid 44 was de-energized at the end of step 5. The light intensity servo 24 continued to operate in step 6 and caused the stepping switch 35 to advance to step 7 when the photocell 12 was illuminated sufficiently to cause the shaft of the servo motor 45 to reverse direction by means of photocell relay 47. The direction of shaft rotation of the servo motor 45 is sensed by a tilting mercury switch whose mount rotates within limits of about 30 degrees. One of two sets of contacts is closed when shaft rotation of the servo motor 45 is clockwise while the other set is closed when rotation is counterclockwise. During a titration one set of contacts causes the stepping switch 35 to advance to step 7 and the other set of contacts causes the stepping switch 35 to advance to step 8 but only if the automatic titrator is in step 7.

After step 7 was completed and the automatic titrator reached step 8 the zero solenoid 40 was energized to switch 35 to step 9 after twenty seconds. In step 9 the timer motor 42 was energized and advanced the stepping switch 35 to step 9 after twenty seconds. In step 9 the zero solenoid 40 sealed in the pneumatic pressure proportional to the tare weight. Titrant solenoid 27 was energized to allow titrant 26 to flow into the disposable cup 10. At the same time the stirrer 14 was energized to aid mixing. The titrant 26 continued to flow into the cup 10 containing the dioctyl adipate sample until the indicator which is clear in an acid medium turned pink. The photocell 12 then received less light and caused the photocell relay 47 to de-energize the titrant solenoid 27 stopping the flow of titrant. The weight of titrant added produced a pneumatic pressure of about 0.5 pounds per square inch. Timer motor 42 was also energized causing stepping switch 35 to advance to step 10 after 20 seconds. Before step 10 additional titrant 26 can be fed to the cup 10 if the color fades. Thus more titrant 26 can be added if the first end point is false. However, no additional titrant 26 can be added when the automatic titrator is in step 10 although the end point color fades. No additional titrant was needed for this titration.

In step 10 the titrant weight solenoid 49 was energized to allow the pneumatic signal proportional to the weight of titrant added to pressurize the titrant weight storage 25. The timer motor 42 was also energized to cause the stepping switch to advance to step 11 after 20 seconds. The stirrer was shut off to allow the weight to be measured under quiet conditions. In step 11 the titrant weight storage 25 was sealed off holding the pneumatic pressure for computation. The lift solenoid was de-energized to release pressure applied to the lift pistons 11. The low pressure regulator 39 supplies air to the top of the lift pistons 11 to force the pistons, the pneumatic weigher 17, and the disposable cup 10 down. The ready indicator 30 was illuminated signifying that the titration was complete and that the automatic titrator was ready for another titration. Pneumatic pressures stored in the sample weight storage 20 and in the titrant weight storage 25 caused the acidity computer to make the ratio measurement $$\left(AN = \frac{mg.\ titrant}{gm.\ sample}\right)$$

The result, 0.11 acid number, was indicated on the acid number gauge 29. The operator then removed the disposable cup 10, discarded the contents into a drain and placed the cup 10 in the trash. Time taken for this analysis was about 5 minutes.

I claim:
1. An automatic batch-type titrating apparatus including:
   a weighing and signalling means,
   a titration vessel received by said weighing and signalling means and supported thereby throughout a titration operation,
   first storage means operatively connected to said weighing and signalling means for receiving and storing a signal representative of the actual weight of sample added to the titrant vessel by an operator of the apparatus,
   a supply of titrant,
   automatic control means operatively connected to said supply of titrant for releasing a quantity of titrant therefrom and adding said quantity to said titration vessel containing said quantity of sample,
   detector means received by said titration vessel for detecting the end point of titration, said detector means being operatively connected to said automatic control means for stopping the addition of titrant upon the detection of the end point, and
   second storage means operatively connected to said weighing and signalling means for receiving and storing a signal representative of the weight of titrant added to titration vessel.

2. The structure as recited in claim 1, wherein said titration vessel is a disposable cup.

3. The structure as recited in claim 1, and further including, computer and indicator means connected to first and second storage means for receiving the stored signals therefrom and computing and indicating a titration result.

4. The structure as recited in claim 1, and further including, a source of solvent, and wherein, said automatic control means is operatively connected to said source of solvent for releasing a quantity of solvent and adding said quantity to said titration vessel.

5. The structure as recited in claim 4, and further including, indicating means operatively connected to said weighing and signalling means for receiving therefrom a signal representative of the weight of solvent added, said indicating means being activated by said signal to indicate to an operator of the apparatus that a quantity of sample may be added to said titration vessel containing said quantity of solvent.

6. The structure as recited in claim 5, wherein said automatic control means further includes sample weight switch means operatively connected to said weighing and signalling means for receiving a signal representative of the weight of sample added by the operator for deactivating said indicating means, thereby notifying the operator of the apparatus that sufficient quantity of sample has been added to the titration vessel.

References Cited

UNITED STATES PATENTS

| | | | |
|---|---|---|---|
| 2,989,377 | 6/1961 | Leisey | 23—253 X |
| 3,019,091 | 1/1962 | Schneider | 23—253 |
| 3,073,682 | 1/1963 | Lindsley | 23—253 X |
| 3,157,471 | 11/1964 | Harrison | 23—253 |
| 3,165,127 | 1/1965 | Rosenberg | 141—83 |
| 3,238,978 | 3/1966 | De Frenne | 141—83 |

MORRIS O. WOLK, *Primary Examiner.*

ELLIOTT A. KATZ, *Assistant Examiner.*

U.S. Cl. X.R.

141—83; 177—63; 222—77